(12) United States Patent
Fujiwara et al.

(10) Patent No.: US 12,179,296 B2
(45) Date of Patent: Dec. 31, 2024

(54) JUNCTION STRUCTURE

(71) Applicant: Panasonic Intellectual Property Management Co., Ltd., Osaka (JP)

(72) Inventors: Junji Fujiwara, Osaka (JP); Tatsuyuki Nakagawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 672 days.

(21) Appl. No.: 17/483,634

(22) Filed: Sep. 23, 2021

(65) Prior Publication Data

US 2022/0023966 A1 Jan. 27, 2022

Related U.S. Application Data

(63) Continuation of application No. PCT/JP2020/015775, filed on Apr. 8, 2020.

(30) Foreign Application Priority Data

Apr. 19, 2019 (JP) .................. 2019-080115

(51) Int. Cl.
*B23K 9/23* (2006.01)
*B23K 9/02* (2006.01)
(Continued)

(52) U.S. Cl.
CPC ............... *B23K 9/23* (2013.01); *B23K 9/0203* (2013.01); *B32B 7/04* (2013.01); *B32B 15/012* (2013.01); *B32B 15/017* (2013.01)

(58) Field of Classification Search
CPC .......... B23K 9/23; B23K 9/232; B23K 9/235; B23K 9/0203; B23K 9/007; B32B 15/012; B32B 15/017; F16B 5/08
See application file for complete search history.

(56) References Cited

U.S. PATENT DOCUMENTS 2,792,490 A * 5/1957 Risch ................... B23K 9/0203
228/56.3
3,102,948 A * 9/1963 McCampbell ......... B23K 9/007
219/127
(Continued)

FOREIGN PATENT DOCUMENTS

CN 102059460 5/2011
CN 108856983 11/2018
(Continued)

OTHER PUBLICATIONS

Office Action issued May 4, 2023 in corresponding Indian Patent Application No. 202147045847, with English language translation.
(Continued)

*Primary Examiner* — Jonathan P Masinick
(74) *Attorney, Agent, or Firm* — Wenderoth, Lind & Ponack, L.L.P.

(57) ABSTRACT

Second member (20) includes a material that is difficult to weld to first member (10). First member (10) is provided with first penetrating part (11) penetrating in a thickness direction. Third member (30) is arc-welded to an inner peripheral surface of first penetrating part (11) and opening surface (10a) of first member (10) via second penetrating part (21) of second member (20). Second member (20) is compressed by flange (31) and first member (10) by solidification contraction of third member (30), and second member (20) is therefore fixed between flange (31) of third member (30) and first member (10).

16 Claims, 13 Drawing Sheets

(51) Int. Cl.
  *B32B 7/04* (2019.01)
  *B32B 15/01* (2006.01)

(56) References Cited

U.S. PATENT DOCUMENTS

| | | | | |
|---|---|---|---|---|
| 3,449,543 A * | 6/1969 | Sciaky | ................... | B23K 9/007 |
| | | | | 219/130.51 |
| 3,549,857 A * | 12/1970 | Carter | ................... | B23K 9/1675 |
| | | | | 219/137 R |
| 4,818,629 A * | 4/1989 | Jenstrom | ................... | B01J 19/02 |
| | | | | 428/614 |
| 6,337,147 B1 * | 1/2002 | Haszler | ................... | B23K 9/23 |
| | | | | 148/415 |
| 7,150,391 B2 * | 12/2006 | Fujimoto | ............. | B23K 9/0026 |
| | | | | 219/121.64 |
| 10,081,071 B2 * | 9/2018 | Furusako | ........... | B23K 35/0255 |
| 10,354,764 B2 * | 7/2019 | Kamo | ................... | B23K 26/21 |
| 10,500,681 B2 * | 12/2019 | Kodama | ............. | B23K 9/0035 |
| 10,850,342 B2 * | 12/2020 | Inoue | ................... | B23K 9/232 |
| 10,870,166 B2 * | 12/2020 | Hahnlen | ............... | B32B 15/012 |
| 10,981,246 B2 * | 4/2021 | Kawamoto | ............ | B23K 11/30 |
| 11,525,469 B2 * | 12/2022 | Fujiwara | ............... | B23K 33/00 |
| 11,536,305 B2 * | 12/2022 | Fujiwara | ................ | B23K 26/28 |
| 11,806,806 B2 * | 11/2023 | Kawamoto | ......... | B29C 66/7212 |
| 11,806,809 B2 * | 11/2023 | Fujiwara | ............. | B23K 26/323 |
| 11,839,940 B2 * | 12/2023 | Fujiwara | ................... | B23K 9/23 |
| 2009/0314757 A1 * | 12/2009 | Yelistratov | ............. | B23K 9/025 |
| | | | | 219/137 R |
| 2019/0039165 A1 * | 2/2019 | Fujimura | ................ | C22C 38/04 |
| 2019/0101145 A1 | 4/2019 | Fujiwara et al. | | |
| 2019/0257333 A1 | 8/2019 | Fujiwara et al. | | |
| 2020/0384567 A1 * | 12/2020 | Suzuki | ................. | B21D 28/26 |
| 2020/0398375 A1 * | 12/2020 | Fujiwara | ................ | B23K 26/21 |
| 2021/0387278 A1 * | 12/2021 | Suzuki | ................. | B23K 10/022 |
| 2023/0191520 A1 * | 6/2023 | Fujiwara | ................ | B23K 9/173 |
| | | | | 219/127 |
| 2024/0139880 A1 * | 5/2024 | Oshida | ................ | B23K 26/32 |

FOREIGN PATENT DOCUMENTS

| | | | | |
|---|---|---|---|---|
| CN | 109562474 | | 4/2019 | |
| CN | 109641307 | | 4/2019 | |
| DE | 1164208 B | * | 2/1964 | |
| DE | 1266897 B | * | 4/1968 | |
| EP | 3 205 435 | | 8/2017 | |
| EP | 3205433 | | 8/2017 | |
| EP | 3 505 289 | | 7/2019 | |
| EP | 3517243 | | 7/2019 | |
| FR | 1476266 A | * | 4/1967 | |
| JP | 52-114446 | | 9/1977 | |
| JP | 58-110175 | | 6/1983 | |
| JP | 59125278 A | * | 7/1984 | ............... B23K 9/23 |
| JP | 2010-227956 | | 10/2010 | |
| JP | 2018-34167 | | 3/2018 | |
| JP | 2018-051570 | | 4/2018 | |
| WO | 2017/170213 | | 10/2017 | |
| WO | 2018/030272 | | 2/2018 | |
| WO | WO-2018042679 A1 | * | 3/2018 | ............. B23K 10/02 |
| WO | WO-2018042680 A1 | * | 3/2018 | |
| WO | WO-2018042681 A1 | * | 3/2018 | ............. B23K 10/02 |
| WO | WO-2018056172 A1 | * | 3/2018 | ............. B21D 22/02 |

OTHER PUBLICATIONS

English Translation of Chinese Search Report dated Sep. 26, 2022 for the related Chinese Patent Application No. 202080029247.X.
EPC Office Action issued Feb. 16, 2024 in corresponding European Patent Application No. 20791590.1.
International Search Report of PCT application No. PCT/JP2020/015775 dated Jun. 9, 2020.
English translation of Search Report issued Jun. 24, 2022 in counterpart Chinese Patent Application No. 202080029247.X.
Extended European Search Report issued May 19, 2022 in corresponding European Patent Application No. 20791590.1.

* cited by examiner

JUNCTION STRUCTURE

This application is a continuation of the PCT International Application No. PCT/JP2020/015775 filed on Apr. 8, 2020, which claim the benefit of foreign priority of Japanese patent application No. 2019-080115 filed on Apr. 19, 2019, the contents all of which are incorporated herein by reference.

TECHNICAL FIELD

The present invention relates to a joining structure.

BACKGROUND ART

PTL 1 discloses a joining structure in which a first metal material and a dissimilar material that is difficult to weld to the first metal material are overlapped with each other, and a filler material (welding wire) is arc-welded via a penetrating part of the dissimilar material.

At this time, a flange is formed from the melted filler material so as to cover an outer periphery on an upper surface of the penetrating part of the dissimilar material. As a result, the dissimilar material and the first metal material are fixed by a compression fixing force between the flange and the first metal material by solidification contraction of the filler material with respect to the first metal material.

CITATION LIST

Patent Literature

PTL 1: International Publication No. 2018/030272

SUMMARY OF THE INVENTION

Technical Problem

In the invention disclosed in PTL 1, for example, when a hole diameter of the penetrating part is small, a welding area of the filler material in the first metal material is also small, and there is a possibility that joining strength may be insufficient.

The present invention has been made in view of such a point, and an object of the present invention is to increase a welding area of a filler material to secure joining strength.

Solution to Problem

The present invention is directed to a joining structure joining, to each other, a first member including a metal material, a second member including a material that is difficult to weld to the first member, and a third member including a filler material welded to the first member, and the following solution is achieved.

That is, in the first aspect of the present invention, the first member has a first penetrating part penetrating in a thickness direction. The second member has a second penetrating part that opens at a position corresponding to the first penetrating part. The third member includes a flange that presses a peripheral edge of the second penetrating part. The third member is arc-welded, via the second penetrating part, to an inner peripheral surface of the first penetrating part of the first member and an opening surface of the first member opened by the second penetrating part of the second member. The second member is compressed by the flange and the first member by solidification contraction of the third member, and the second member is therefore fixed between the flange of the third member and the first member.

In the first aspect of the present invention, the second member includes a material that is difficult to weld to the first member. The first member is provided with the first penetrating part penetrating in the thickness direction. The third member is arc-welded to the inner peripheral surface of the first penetrating part and the opening surface of the first member opened by the second penetrating part of the second member via the second penetrating part of the second member. The second member is compressed by the flange and the first member by solidification contraction of the third member, and the second member is therefore fixed between the flange of the third member and the first member.

As described above, the first member is provided with the first penetrating part, and the third member is arc-welded to the inner peripheral surface of the first penetrating part and the opening surface of the first member opened by the second penetrating part of the second member. Thus, a welding area of the third member can be increased. This can secure joining strength between the first member, the second member, and the third member.

In a second aspect of the present invention, according to the first aspect of the present invention, the flange protrudes radially outward from the second penetrating part on a surface of the second member opposite to the first member.

In the second aspect of the present invention, the second member can be fixed between the flange and the first member by pressing a surface of the second member opposite to the first member by the flange.

In a third aspect of the present invention, according to the first aspect of the present invention, the second penetrating part is defined by the peripheral edge. The peripheral edge includes a tapered part tapered toward the first member. The flange presses the tapered part.

In the third aspect of the present invention, the tapered part provided in the peripheral edge allows the filler material having been melted to easily flow toward the first penetrating part. Further, the flange formed in a shape along the tapered part can suppress a thickness of the flange protruding from the second member.

In a fourth aspect of the present invention, according to any one of the first to third aspects of the present invention, the first penetrating part has a tapered shape. The first penetrating part has a close end that is close to the second member and a far end that is far from the second member in the thickness direction. The far end has a smaller size than the close end.

In the fourth aspect of the present invention, the first penetrating part having a tapered shape that gradually narrows allows the filler material having been melted to easily flow from the close end toward the far end in the first penetrating part.

In a fifth aspect of the present invention, according to any one of the first to third aspects of the present invention, the first penetrating part has a tapered shape. The first penetrating part has a close end that is close to the second member and a far end that is far from the second member in the thickness direction. The far end has a larger size than the close end.

In the fifth aspect of the present invention, the first penetrating part has a tapered shape that gradually widens. As a result, when the filler material having been melted is solidified in a wide portion of the first penetrating part, the third member bites into the first penetrating part, and the joining strength can be increased.

In a sixth aspect of the present invention, according to any one of the first to fifth aspect of the present invention, the first penetrating part includes a plurality of first small penetrating parts smaller than the first penetrating part.

In the sixth aspect of the present invention, by providing the plurality of first small penetrating parts, the filler material having been melted can be welded while being dispersed in the plurality of first small penetrating parts. Further, the third member bites into the plurality of first small penetrating parts, and thus a wedge effect can be obtained in the plurality of first small penetrating parts to improve joining stability.

In a seventh aspect of the present invention, according to any one of the first to sixth aspects of the present invention, the first member includes the peripheral edge that defines the first penetrating part. The third member has a lock to be locked to the peripheral edge of the first member on a surface of the first member opposite to the second member.

In the seventh aspect of the present invention, the lock can prevent the third member from coming off from the first penetrating part. Further, since the first member and the second member are fixed between the flange and the lock, the joining strength can be increased.

An eighth aspect of the present invention, according to any one of the first to seventh aspects of the present invention, includes a fixing member overlapped with a surface of the second member opposite to the first member. The fixing member has a fixing hole that opens at a position corresponding to the second penetrating part and the first penetrating part. The third member is arc-welded, via the fixing hole and the second penetrating part, to an inner peripheral surface of the first penetrating part and an opening surface of the first member opened by the second penetrating part of the second member. The flange presses the peripheral edge of the second member via the fixing member. The fixing member and the second member are compressed by the flange and the first member by the solidification contraction of the third member, and thus the fixing member and the second member are fixed between the flange and the first member.

In the eighth aspect of the present invention, the fixing member is overlapped with the second member. The third member is arc-welded to the inner peripheral surface of the first penetrating part and the opening surface of the first member opened by the second penetrating part of the second member via the fixing hole of the fixing member and the second penetrating part of the second member. By the solidification contraction of the third member, the fixing member and the second member are compressed between the flange of the third member and the first member by the flange and the first member, and thus the fixing member and the second member are fixed.

Thus, when the third member is arc-welded to the inner peripheral surface of the first penetrating part of the first member and the opening surface of the first member opened by the second penetrating part of the second member, the flange can be formed while suppressing the amount of heat input to the second member by the fixing member. Then, the second member as a dissimilar material can be sandwiched and fixed between the first member and the fixing member.

In a ninth aspect of the present invention, according to any one of the first to eighth aspects of the present invention, the second member further includes a step that opens at a surface opposite to the first member, and the second penetrating part is disposed on a bottom surface of the step.

In the ninth aspect of the present invention, a second penetrating part is formed on the bottom surface of the step of the second member. Thus, the flange of the third member is disposed in the step, and thus the flange can be prevented from protruding from the second member.

In a tenth aspect of the present invention, according to the ninth aspect of the present invention, the bottom surface of the step is inclined toward the second penetrating part.

In the tenth aspect of the present invention, the bottom surface of the step inclined toward the second penetrating part allows the filler material having been melted to easily flow toward the second penetrating part.

In an eleventh aspect of the present invention, according to any one of the first to tenth aspects of the present invention, the third member includes a first joint welded to the first member and a second joint welded to the first joint and constituting the flange.

In the eleventh aspect of the present invention, the third member formed separately into the first joint and the second joint allows selective use of a welding method or welding condition in consideration of material characteristics of the second member.

For example, when the filler material having been melted is welded to the first member via the second penetrating part, short-circuit welding in which spread of arc is small may be performed with heat input necessary for melting to form the first joint. Thereafter, pulse welding with positive polarity or alternating current in which the arc spreads largely may be performed with such a low heat input not to melt the second member to form the second joint. As a result, the flange can be formed while suppressing heat input amount to the second member.

In a twelfth aspect of the present invention, according to any one of the first to eleventh aspects of the present invention, the first penetrating part has a smaller size than the second penetrating part. The opening surface is a region of the upper surface of the first member within the second penetrating part.

As described above, a diameter of the first penetrating part is smaller than a diameter of the second penetrating part of the second member (a diameter of the opening surface of the first member opened by the second penetrating part of the second member). This makes it possible to perform welding while suppressing heat input to the first member and the second member. Further, the inner peripheral surface and the opening surface of the first penetrating part form a convex shape of the third member. The convex shape increases a surface area to be joined. The concave shape exhibits an anchor effect like a wedge to further improve the joining strength and reliability.

A thirteenth aspect of the present invention relates to a joining structure including a first member, a second member, and a third member. The first member has an upper surface and a lower surface opposite the upper surface. The first member has a first penetrating part extending from the upper surface to the lower surface. The first member includes a metal material. The second member includes a second penetrating part that opens at a position corresponding to the first penetrating part and is larger than the first penetrating part, and includes a peripheral edge defining the second penetrating part. The second member includes a material that is difficult to weld to the first member. The second member is disposed on the upper surface of the first member. The third member includes a welded part and a flange connected to the welded part via the second penetrating part. The welded part is arc-welded to an inner peripheral surface of the first penetrating part and a periphery of the first penetrating part on the upper surface of the first member. The flange covers the peripheral edge. The third member includes a filler material welded to the first member. The second member is compressed by the flange and the first member by solidification contraction of the third member, and the second member is therefore fixed between the flange and the first member.

As described above, the first member is provided with the first penetrating part, and the third member is arc-welded to the inner peripheral surface of the first penetrating part and the opening surface of the first member opened by the second penetrating part of the second member. Thus, a welding area of the third member can be increased. This can secure joining strength between the first member, the second member, and the third member.

A fourteenth aspect of the present invention relates to a joining method including preparation of a first member, preparation of a second member, and formation of a third member. The first member has an upper surface and a lower surface opposite the upper surface. The first member has a first penetrating part extending from the upper surface to the lower surface. The first member includes a metal material. The second member includes a second penetrating part and a peripheral edge defining the second penetrating part. The second member includes a material that is difficult to weld to the first member. The second member is disposed on the upper surface of the first member such that the second penetrating part is located corresponding to the first penetrating part and an opening surface of the first member opened by the second penetrating part of the second member is formed. The third member is formed by being arc-welded to the inner peripheral surface of the first penetrating part of the first member and the opening surface of the first member via the second penetrating part. The third member includes a filler material welded to the first member. The third member includes a flange that presses the peripheral edge. The second member is compressed by the flange and the first member by solidification contraction of the third member, and the second member is therefore fixed between the flange of the third member and the first member.

In the fourteenth aspect of the present invention, the second member includes a material that is difficult to weld to the first member. The first member is provided with the first penetrating part penetrating in the thickness direction. The third member is arc-welded to the inner peripheral surface of the first penetrating part and the opening surface of the first member opened by the second penetrating part of the second member via the second penetrating part of the second member. The second member is compressed by the flange and the first member by solidification contraction of the third member, and the second member is therefore fixed between the flange of the third member and the first member.

As described above, the first member is provided with the first penetrating part, and the third member is arc-welded to the inner peripheral surface of the first penetrating part and the opening surface of the first member opened by the second penetrating part of the second member. Thus, a welding area of the third member can be increased. This can secure joining strength between the first member, the second member, and the third member.

Advantageous Effect of Invention

In the present invention, the welding area of the filler material can be increased to secure the joining strength.

DESCRIPTION OF EMBODIMENTS

Hereinafter, exemplary embodiments of the present invention will be described with reference to the drawings. Note that the following description of preferred exemplary embodiments is merely exemplary in nature, and is not intended to limit the present invention, its application, or its use.

First Exemplary Embodiment

Figure 1:
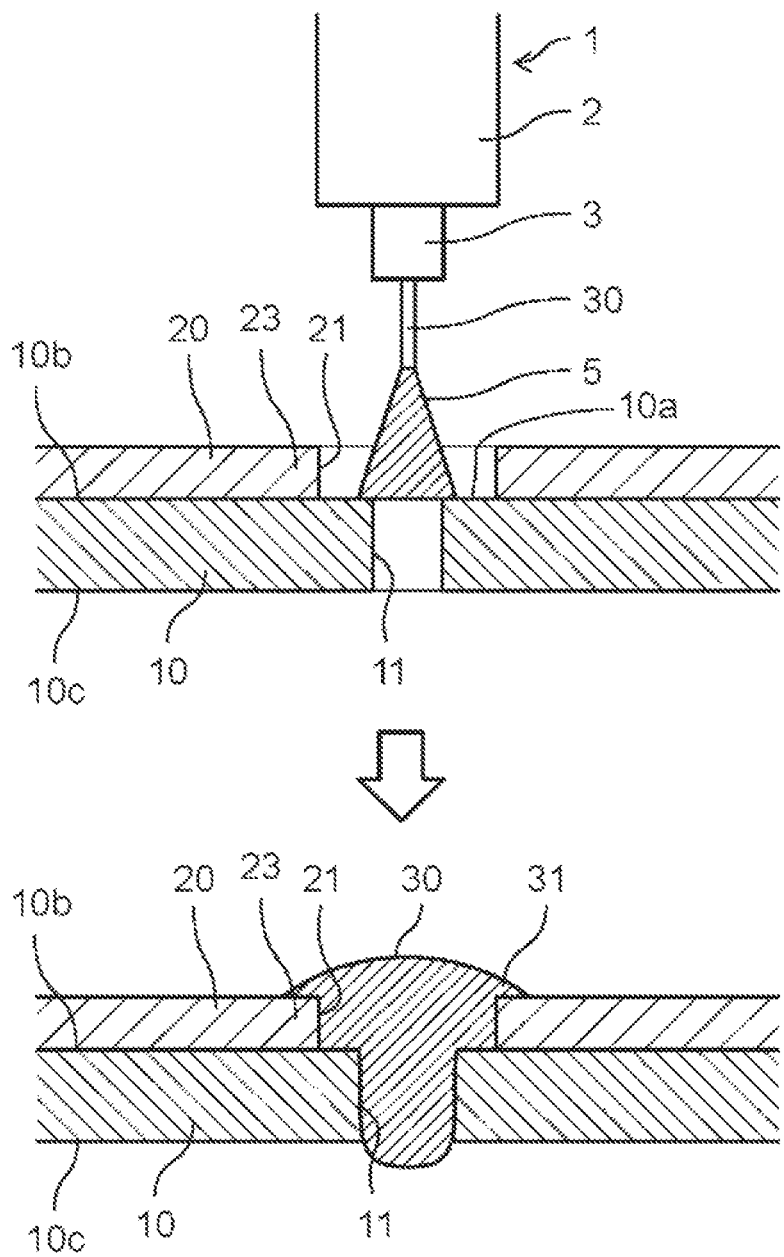
FIG. 1 is a side sectional view for describing a joining structure according to a first exemplary embodiment.

FIG. 1 illustrates a joining structure that joins first member 10 including a metal material, second member 20 including a material that is difficult to weld to first member 10, and third member 30 including a filler material to each other.

First member 10 is a member having a plate shape and including a metal material. First member 10 has first penetrating part 11 penetrating in a thickness direction. In an example illustrated in FIG. 1, first penetrating part 11 is a circular through hole. First penetrating part 11 is formed as a through hole by, for example, milling, lathing, drilling, or laser machining. First member 10 has upper surface 10b and lower surface 10c opposite to upper surface 10b. Upper surface 10b faces second member 20. First penetrating part 11 extends from upper surface 10b to lower surface 10c.

Second member 20 is a member having a plate shape and including a material that is difficult to weld to first member 10. Second member 20 is overlapped on an upper side of first member 10. Second member 20 has second penetrating part 21 penetrating in a thickness direction. Second penetrating part 21 is open at a position corresponding to first penetrating part 11 of first member 10. The upper surface of first member 10 opened by second penetrating part 21 of second member 20 overlapped with first member 10 is opening surface 10a. Opening surface 10a corresponds to an upper surface of first penetrating part 11. Second member 20 further includes peripheral edge 23 that defines second penetrating part 21.

In the present exemplary embodiment, second penetrating part 21 is described as a circular through hole, but may be an elliptical or elongated through hole. Penetrating part 21 may be a through groove. The through groove penetrates from an upper surface to a lower surface in a thickness direction of second member 20. The through groove is further opened at both ends or one end in a length direction of the through groove. In this respect, the through groove is different from an elongated through hole. The elongated through hole is closed at both ends in the length direction of the through hole. For example, when the through groove is opened at both ends in the length direction of the through groove, second member 20 includes at least two independent plates disposed on first member 10. The two plates are arranged with an elongated gap therebetween. This gap forms the through groove as the second penetrating part. In a case where second member 20 includes a plurality of independent plates and forms a plurality of through grooves, third member 30 as a filler material having been melted is welded to first member 10 via the plurality of through grooves, and then second member 20 is sandwiched between third member 30 and first member 10 to fix second member 20 to first member 10.

Third member 30 includes a filler material that is a metal material of a similar type to first member 10. Here, the metal materials of a similar type are metals that can be welded to each other, and are metal materials that join well by welding, such as iron-based metal materials and non-ferrous metal materials, in addition to the same materials. In other words, the metal materials of a similar type are materials having good compatibility in welding.

Specifically, examples of a combination of first member 10 and third member 30 at time of welding include the following. Examples of a combination of iron-based metal materials include mild steel and mild steel, stainless steel and stainless steel, mild steel and high-tensile strength steel, and high-tensile strength steel and high-tensile strength steel. Examples of a combination of nonferrous metal materials include aluminum and aluminum, aluminum and an aluminum alloy, and an aluminum alloy and an aluminum alloy.

Further, second member 20 as a dissimilar material includes a material different from the materials of first member 10 and third member 30 as metal materials of a similar type, and includes a material that is difficult to weld to first member 10 and third member 30.

For example, when first member 10 and third member 30 as metal materials of a similar type include an iron-based metal material, second member 20 as a dissimilar material is a non-ferrous metal material such as a copper material or an aluminum material. In addition, for example, a resin material such as carbon fiber reinforced plastics (CFRP) or polyethylene terephthalate (PET) is also exemplified as a dissimilar material to the metal material.

In the following description, a case where a soft steel material is used as first member 10, an aluminum material is used as second member 20, and a soft steel material is used as third member 30 serving as a filler material will be described.

Arc welder 1 includes nozzle 2 and tip 3. Nozzle 2 supplies shielding gas or the like to a welded portion of an object to be welded. Tip 3 supplies a welding current to third member 30.

Arc welder 1 generates arc 5 by supplying a welding current while feeding third member 30 to first penetrating part 11 via second penetrating part 21. Arc 5 is irradiated to an inner peripheral surface of first penetrating part 11 of first member 10 and opening surface 10a as the upper surface of first member 10. Third member 30 melted by arc 5 is melt-bonded to the inner peripheral surface of first penetrating part 11 and opening surface 10a of first member 10. At this time, a melting amount of third member 30 is adjusted to such an extent that third member 30 does not flow down from below first penetrating part 11. Furthermore, the melting amount of third member 30 may be adjusted to an amount that allows a part of third member 30 to protrude from below first penetrating part 11. As a result, third member 30 melt-bonded to first penetrating part 11 by arc welding is further improved in joining strength and reliability by an anchor effect like a wedge with respect to first member 10.

Then, third member 30 having been melted is layered in opening surface 10a on the upper surface of first member 10 and second penetrating part 21 of the second member, fills inside of second penetrating part 21, flows out to peripheral edge 23 on the upper surface of second penetrating part 21, and spreads in a flange shape.

In a process in which third member 30 having been melted becomes bead, third member 30 is provided with flange 31 that presses peripheral edge 23 of second penetrating part 21. Flange 31 protrudes radially outward from second penetrating part 21 on a surface (upper surface in FIG. 1) of second member 20 opposite to first member 10.

As third member 30 solidifies and contracts, second member 20 is compressed by flange 31 and first member 10. By this compression, second member 20 as a dissimilar material is fixed between flange 31 and first member 10.

As described above, in the joining structure according to the present exemplary embodiment, first member 10 is provided with first penetrating part 11, and third member 30 is welded to the inner peripheral surface of first penetrating part 11 and opening surface 10a of first member 10. Thus, a welding area of third member 30 can be increased. As a result, joining strength between first member 10, second member 20, and third member 30 can be secured.

Further, the inner peripheral surface of first penetrating part 11 and opening surface 10a form a convex shape of third member 30. The convex shape increases a surface area to be joined. The concave shape exhibits an anchor effect like a wedge to further improve the joining strength and reliability. A diameter of first penetrating part 11 is smaller than a diameter of second penetrating part 21 of second member 20 (a diameter of opening surface 10a of first member 10 opened by second penetrating part 21 of second member 20). This makes it possible to perform welding while suppressing heat input to first member 10 and second member 20.

Second Exemplary Embodiment

Hereinafter, the same parts as those in the first exemplary embodiment will be denoted by the same reference marks, and only differences will be described.

Figure 2:
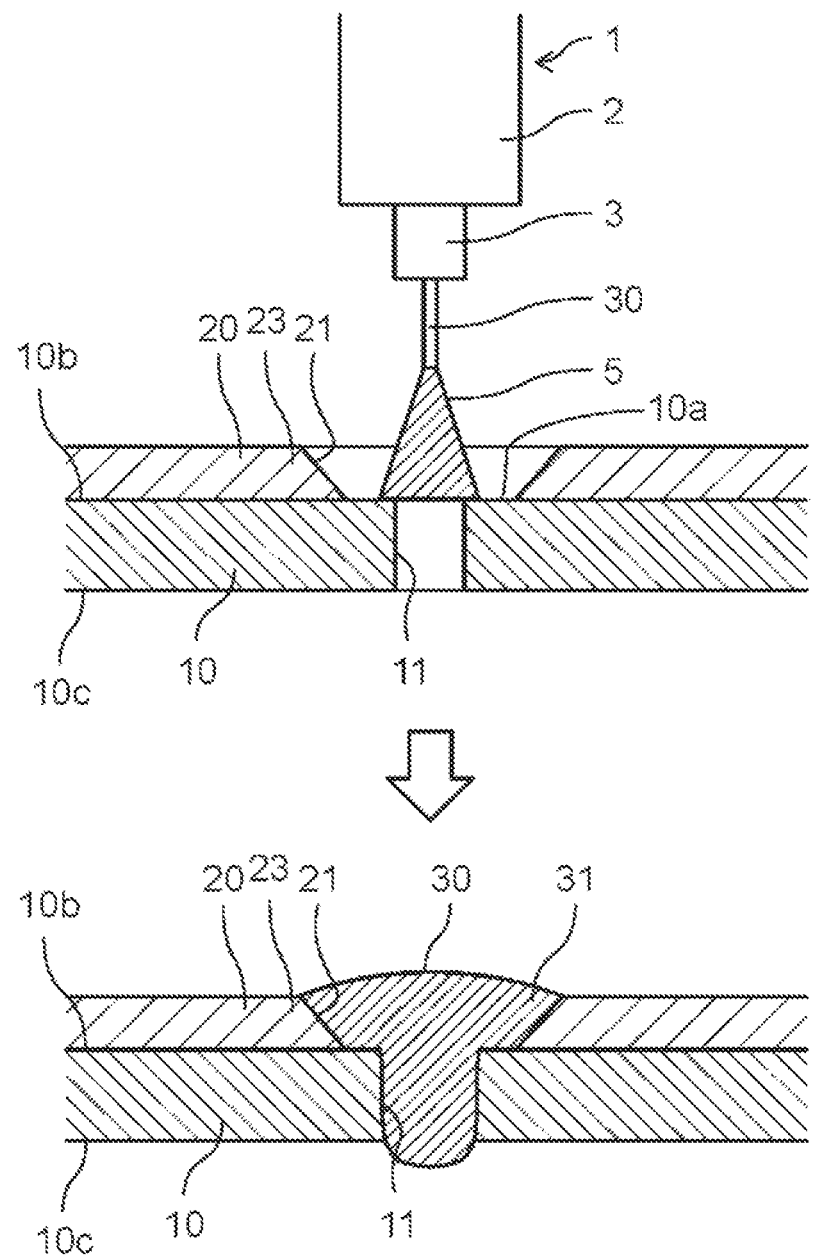
FIG. 2 is a side sectional view for describing a joining structure according to a second exemplary embodiment.

As illustrated in FIG. 2, first member 10 has first penetrating part 11 penetrating in the thickness direction. First penetrating part 11 is a circular through hole.

Second member 20 has second penetrating part 21 that opens at a position corresponding to first penetrating part 11 of first member 10. Second penetrating part 21 is defined by peripheral edge 23. Peripheral edge 23 includes tapered part 22 tapered toward first member 10.

Third member 30 is melted by arc 5. Third member 30 having been melted flows toward first penetrating part 11 along tapered part 22 of second penetrating part 21, and is melt-bonded to the inner peripheral surface of first penetrating part 11 and opening surface 10a of first member 10. At this time, a melting amount of third member 30 is adjusted to such an extent that third member 30 does not flow down from below first penetrating part 11.

Then, third member 30 having been melted spreads in a flange shape on an upper surface of tapered part 22 by filling inside of second penetrating part 21.

In a process in which third member 30 having been melted becomes bead, third member 30 is provided with flange 31 that presses tapered part 22.

As third member 30 solidifies and contracts, second member 20 is compressed by flange 31 and first member 10. By this compression, second member 20 as a dissimilar material is fixed between flange 31 and first member 10.

As described above, in the joining structure according to the present exemplary embodiment, tapered part 22 provided on peripheral edge 23 allows third member 30 having been melted to easily flow toward first penetrating part 11. Further, by forming flange 31 in a shape along tapered part 22, a thickness of flange 31 protruding from second member 20 can be suppressed.

Third Exemplary Embodiment

Figure 3:
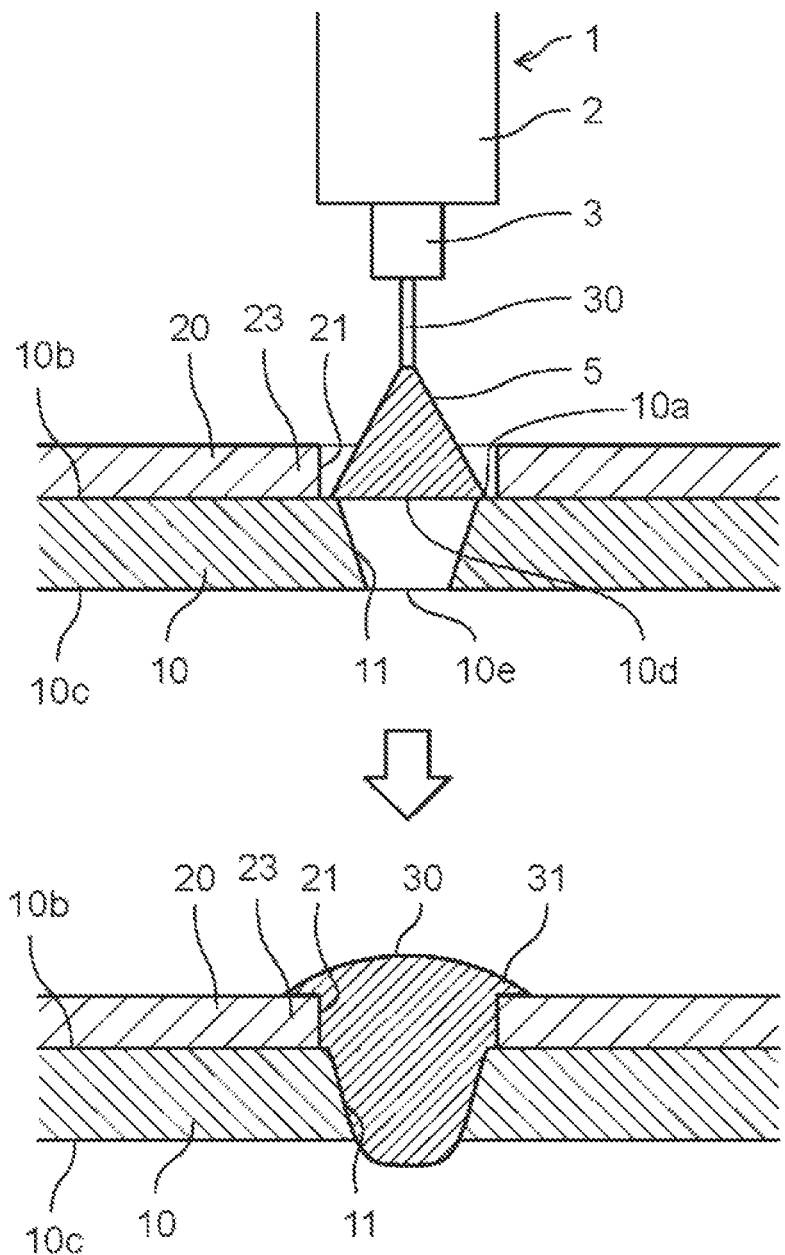
FIG. 3 is a side sectional view for describing a joining structure according to a third exemplary embodiment.

As illustrated in FIG. 3, first member 10 has first penetrating part 11 penetrating in the thickness direction. First penetrating part 11 has a tapered shape tapered toward lower surface 10c. That is, first penetrating part 11 has a tapered shape. First penetrating part 11 has close end 10d that is close to second member 20 and far end 10e that is far from second member 20 in the thickness direction. Far end 10e has a smaller size than close end 10d.

Second member 20 has second penetrating part 21 that opens at a position corresponding to first penetrating part 11 of first member 10.

Third member 30 is melted by arc 5. Third member 30 having been melted flows toward the inside of first penetrating part 11 along the tapered shape of first penetrating part 11, and is melt-bonded to the inner peripheral surface of first penetrating part 11 and opening surface 10a of first member 10. At this time, the melting amount of third member 30 is adjusted to such an extent that third member 30 having been melted does not flow down from below first penetrating part 11.

Then, after filling the inside of second penetrating part 21, third member 30 having been melted flows out to peripheral edge 23 on the upper surface of second member 20 and spreads in a flange shape.

In a process in which third member 30 having been melted becomes bead, third member 30 is provided with flange 31 that presses peripheral edge 23.

As third member 30 solidifies and contracts, second member 20 is compressed by flange 31 and first member 10. By this compression, second member 20 as a dissimilar material is fixed between flange 31 and first member 10.

As described above, in the joining structure according to the present exemplary embodiment, first penetrating part 11 having a tapered shape tapered toward lower surface 10c allows third member 30 having been melted to easily flow toward the inside of first penetrating part 11.

Fourth Exemplary Embodiment

Figure 4:
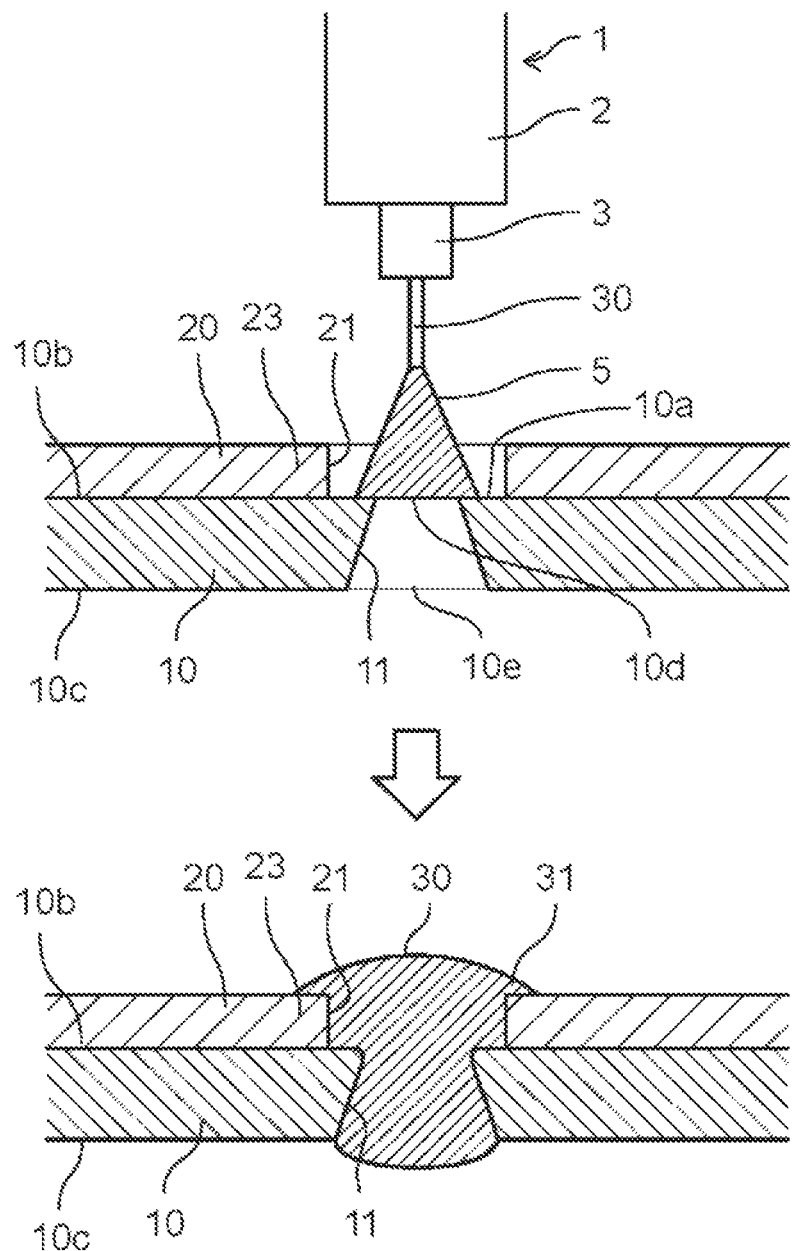
FIG. 4 is a side sectional view for describing a joining structure according to a fourth exemplary embodiment.

As illustrated in FIG. 4, first member 10 has first penetrating part 11 penetrating in the thickness direction. First penetrating part 11 has a tapered shape that widens toward lower surface 10c. That is, first penetrating part 11 has a tapered shape. First penetrating part 11 has close end 10d that is close to second member 20 and far end 10e that is far from second member 20 in the thickness direction. Far end 10e has a larger size than close end 10d.

Second member 20 has second penetrating part 21 that opens at a position corresponding to first penetrating part 11 of first member 10.

Third member 30 is melted by arc 5. Third member 30 having been melted is melt-bonded to the inner peripheral surface of first penetrating part 11 and opening surface 10a of first member 10. At this time, the melting amount of third member 30 is adjusted to such an extent that third member 30 having been melted does not flow down from below first penetrating part 11.

Then, after filling the inside of second penetrating part 21, third member 30 having been melted flows out to peripheral edge 23 on the upper surface of second member 20 and spreads in a flange shape.

In a process in which third member 30 having been melted becomes bead, third member 30 is provided with flange 31 that presses peripheral edge 23.

As third member 30 solidifies and contracts, second member 20 is compressed by flange 31 and first member 10. By this compression, second member 20 as a dissimilar material is fixed between flange 31 and first member 10.

As described above, in the joining structure according to the present exemplary embodiment, first penetrating part 11 has a tapered shape that widens toward lower surface 10c. As a result, when third member 30 having been melted is solidified in a wide portion of first penetrating part 11, third member 30 bites into first penetrating part 11, and the joining strength can be increased.

Fifth Exemplary Embodiment

Figure 5:
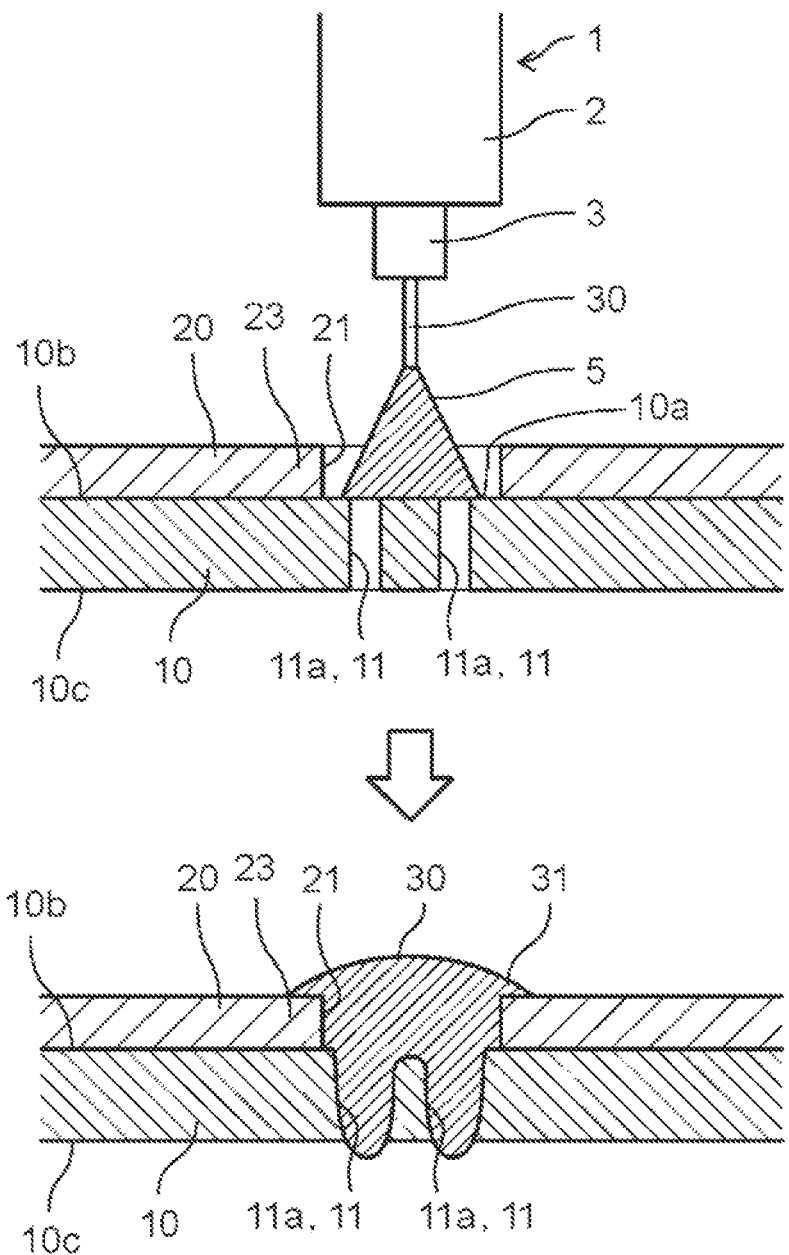
FIG. 5 is a side sectional view for describing a joining structure according to a fifth exemplary embodiment.

As illustrated in FIG. 5, first penetrating part 11 includes a plurality of first small penetrating parts 11a. First member 10 has the plurality of first small penetrating parts 11a penetrating in the thickness direction. Each of the plurality of first small penetrating parts 11a is a circular through hole.

Second member 20 has one second penetrating part 21 that opens at a position corresponding to the plurality of first small penetrating parts 10a of first member 11.

Third member 30 is melted by arc 5. Third member 30 having been melted is dispersed in the plurality of first small penetrating parts 11a and melt-bonded to an inner peripheral surface of each of the first small penetrating parts 11a and opening surface 10a of first member 10. At this time, the melting amount of third member 30 is adjusted to such an extent that third member 30 having been melted does not flow down from below first small penetrating parts 11a.

Then, after filling the inside of second penetrating part 21, third member 30 having been melted flows out to peripheral edge 23 on the upper surface of second member 20 and spreads in a flange shape.

In a process in which third member 30 having been melted becomes bead, third member 30 is provided with flange 31 that presses peripheral edge 23.

As third member 30 solidifies and contracts, second member 20 is compressed by flange 31 and first member 10. By this compression, second member 20 as a dissimilar material is fixed between flange 31 and first member 10.

As described above, in the joining structure according to the present exemplary embodiment, by providing the plurality of first small penetrating parts 11a, third member 30 having been melted can be welded while being dispersed in the plurality of first small penetrating parts 11a. Further, third member 30 bites into the plurality of first small penetrating parts 11a, and thus a wedge effect can be obtained in the plurality of first small penetrating parts 11a to improve joining stability.

Sixth Exemplary Embodiment

Figure 6:
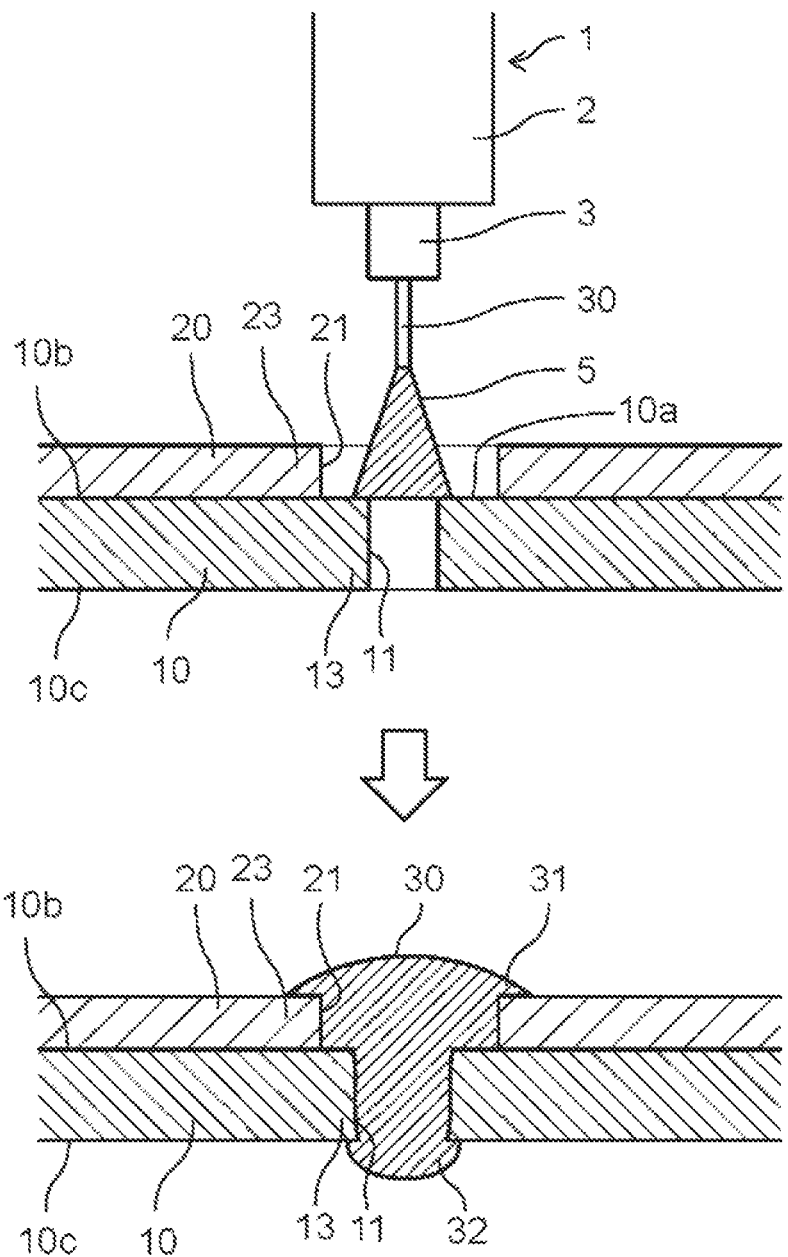
FIG. 6 is a side sectional view for describing a joining structure according to a sixth exemplary embodiment.

As illustrated in FIG. 6, first member 10 has first penetrating part 11 penetrating in the thickness direction. First penetrating part 11 is a circular through hole.

Second member 20 has second penetrating part 21 that opens at a position corresponding to first penetrating part 11 of first member 10.

Third member 30 is melted by arc 5. Third member 30 having been melted is melt-bonded to the inner peripheral surface of first penetrating part 11 and opening surface 10a of first member 10. At this time, the melting amount of third member 30 is adjusted to such an extent that third member 30 having been melted protrudes from below first penetrating part 11 and spreads to peripheral edge 13 on the lower surface of first penetrating part 11.

Then, after filling the inside of second penetrating part 21, third member 30 having been melted flows out to peripheral edge 23 on the upper surface of second member 20 and spreads in a flange shape.

In a process in which third member 30 having been melted becomes bead, third member 30 is provided with flange 31 pressing peripheral edge 23 and lock 32 locked to peripheral edge 13.

As third member 30 solidifies and contracts, second member 20 is compressed by flange 31 and lock 32. By this compression, first member 10 and second member 20 are fixed between flange 31 and lock 32.

As described above, in the joining structure according to the present exemplary embodiment, lock 32 can prevent third member 30 from coming off from first penetrating part 11. Further, since first member 10 and second member 20 are fixed between flange 31 and lock 32, the joining strength can be increased.

Seventh Exemplary Embodiment

Figure 7:
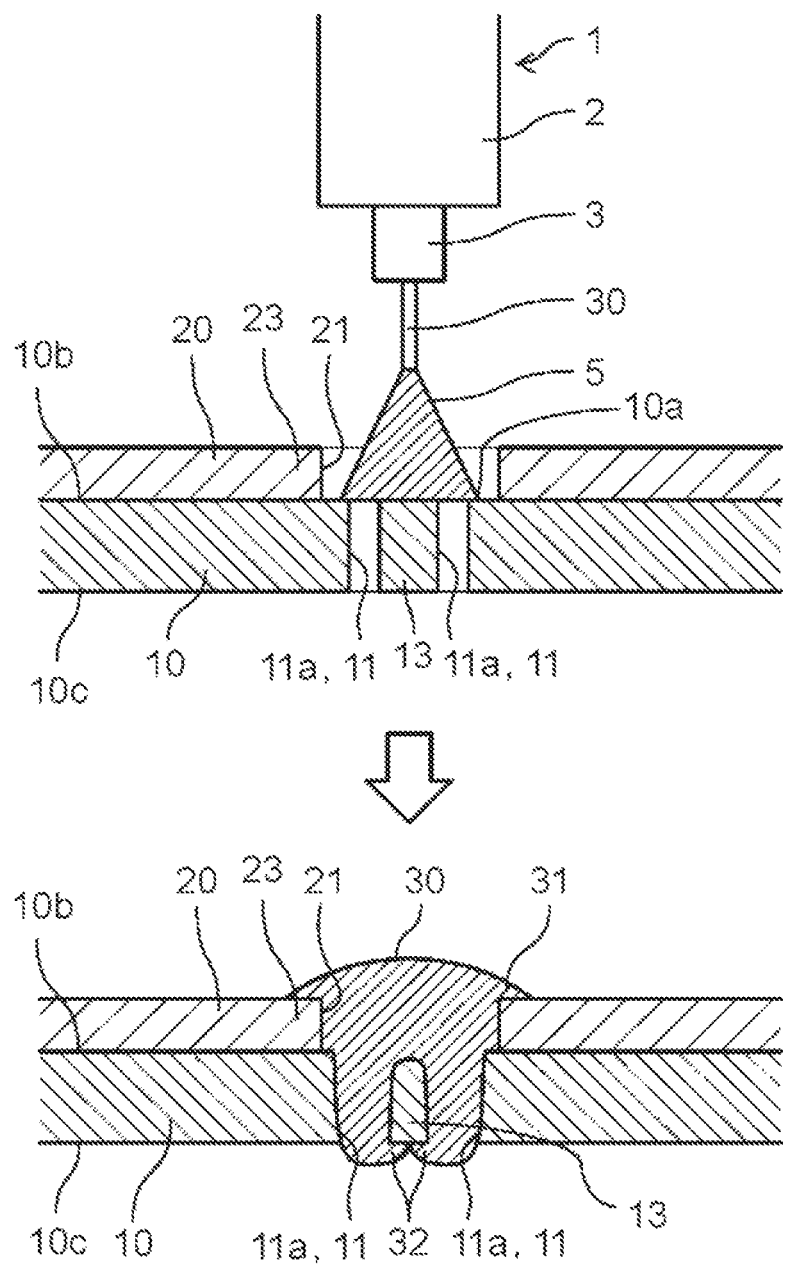
FIG. 7 is a side sectional view for describing a joining structure according to a seventh exemplary embodiment.

As illustrated in FIG. 7, first penetrating part 11 includes the plurality of first small penetrating parts 11a. First member 10 has the plurality of first small penetrating parts 11a penetrating in the thickness direction. Each of the plurality of first small penetrating parts 11a is a circular through hole.

Second member 20 has one second penetrating part 21 that opens at a position corresponding to the plurality of first small penetrating parts 10a of first member 11.

Third member 30 is melted by arc 5. Third member 30 having been melted is dispersed in the plurality of first small penetrating parts 11a and melt-bonded to an inner peripheral surface of each of the first small penetrating parts 11a and opening surface 10a of first member 10. At this time, the melting amount of third member 30 is adjusted to such an extent that third member 30 having been melted protrudes from below first small penetrating parts 11a and spreads to peripheral edge 13 on the lower surface of first member 10. In an example illustrated in FIG. 7, parts of third members 30 protruding from below the plurality of first small penetrating parts 11a are coupled to each other in a bridge shape.

Then, after filling the inside of second penetrating part 21, third member 30 having been melted flows out to peripheral edge 23 on the upper surface of second member 20 and spreads in a flange shape.

In a process in which third member 30 having been melted becomes bead, third member 30 is provided with flange 31 pressing peripheral edge 23 and lock 32 locked to peripheral edge 13.

As third member 30 solidifies and contracts, second member 20 is compressed by flange 31 and first member 10. By this compression, first member 10 and second member 20 are fixed between flange 31 and lock 32.

As described above, in the joining structure according to the present exemplary embodiment, third member 30 can be prevented from coming off from first small penetrating parts 11a by lock 32 protruding from below the plurality of first small penetrating parts 11a and coupled in a bridge shape. Further, third member 30 bites into the plurality of first small penetrating parts 11a, and thus a wedge effect can be obtained in the plurality of first small penetrating parts 11a to improve joining stability.

Eighth Exemplary Embodiment

Figure 8:
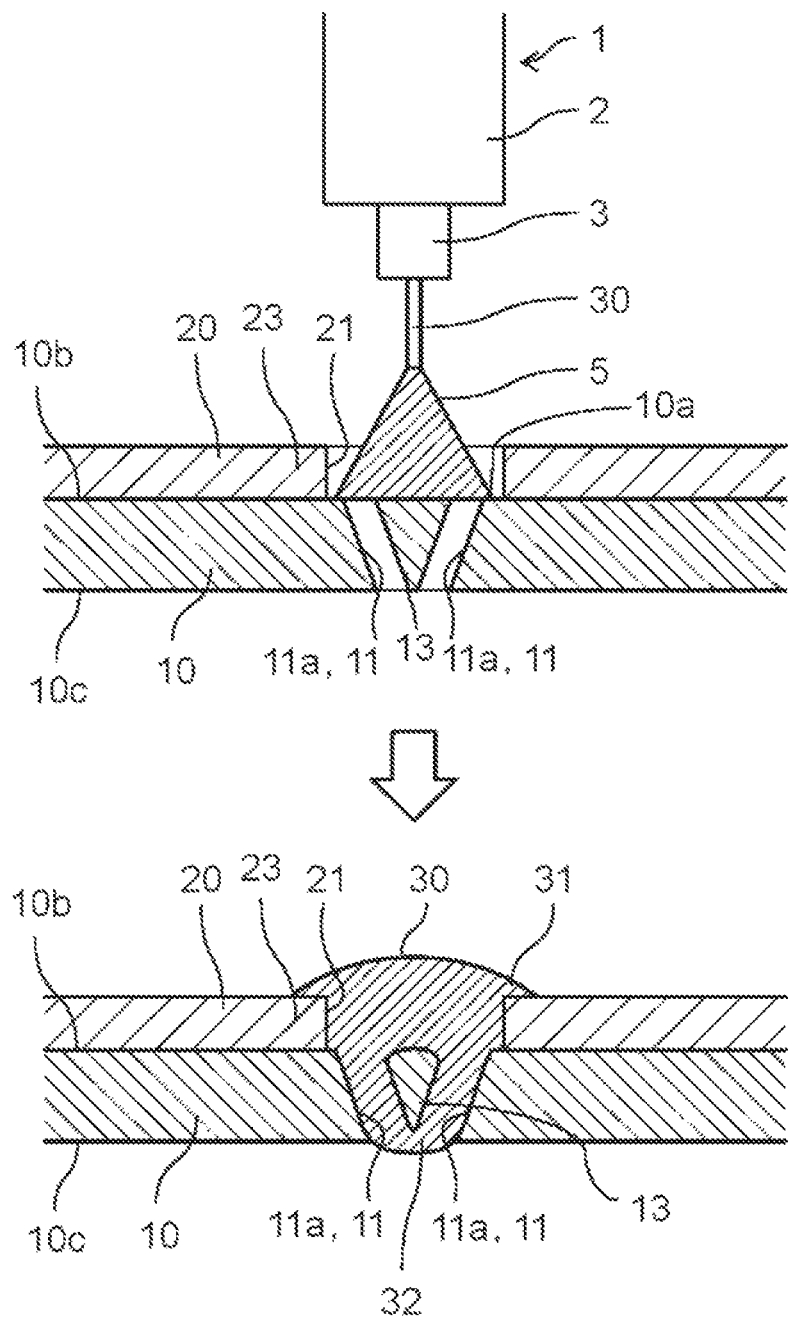
FIG. 8 is a side sectional view for describing a joining structure according to an eighth exemplary embodiment.

As illustrated in FIG. 8, first penetrating part 11 includes the plurality of first small penetrating parts 11a. First member 10 has the plurality of first small penetrating parts 11a penetrating in the thickness direction. Each of the plurality of first small penetrating parts 11a is a circular through hole. The plurality of first small penetrating parts 11a penetrates in a direction inclined with respect to the thickness direction.

In an example shown in FIG. 8, the first small penetrating parts 11a on the left are inclined obliquely downward to the right. First small penetrating part 11a on the right is inclined obliquely downward to the left. As a result, a distance between lower openings in first small penetrating parts 11a on the left and right is shorter than a distance between upper openings.

Second member 20 has one second penetrating part 21 that opens at a position corresponding to the plurality of first small penetrating parts 10a of first member 11.

Third member 30 is melted by arc 5. Third member 30 having been melted flows obliquely downward while being dispersed in the plurality of first small penetrating parts 11a and is melt-bonded to the inner peripheral surface of each of the first small penetrating parts 11a and opening surface 10a of first member 10. At this time, the melting amount of third member 30 is adjusted to such an extent that third member 30 having been melted protrudes from below first small penetrating parts 11a and spreads to peripheral edge 13 on the lower surface of first member 10. In an example illustrated in FIG. 8, parts of third members 30 protruding from below the plurality of first small penetrating parts 11a are coupled to each other in a bridge shape.

Then, after filling the inside of second penetrating part 21, third member 30 having been melted flows out to peripheral edge 23 on the upper surface of second member 20 and spreads in a flange shape.

In a process in which third member 30 having been melted becomes bead, third member 30 is provided with flange 31 pressing peripheral edge 23 and lock 32 locked to peripheral edge 13.

As third member 30 solidifies and contracts, second member 20 is compressed by flange 31 and lock 32. By this compression, first member 10 and second member 20 are fixed between flange 31 and lock 32.

As described above, in the joining structure according to the present exemplary embodiment, the plurality of first small penetrating parts 11a is inclined such that the distance between the lower openings is shorter, and thus parts of third member 30 protruding from below the plurality of first small penetrating parts 11*a* are coupled in a bridge shape to easily form lock 32. Further, lock 32 can prevent third member 30 from coming off from first small penetrating parts 11*a*.

Ninth Exemplary Embodiment

Figure 9:
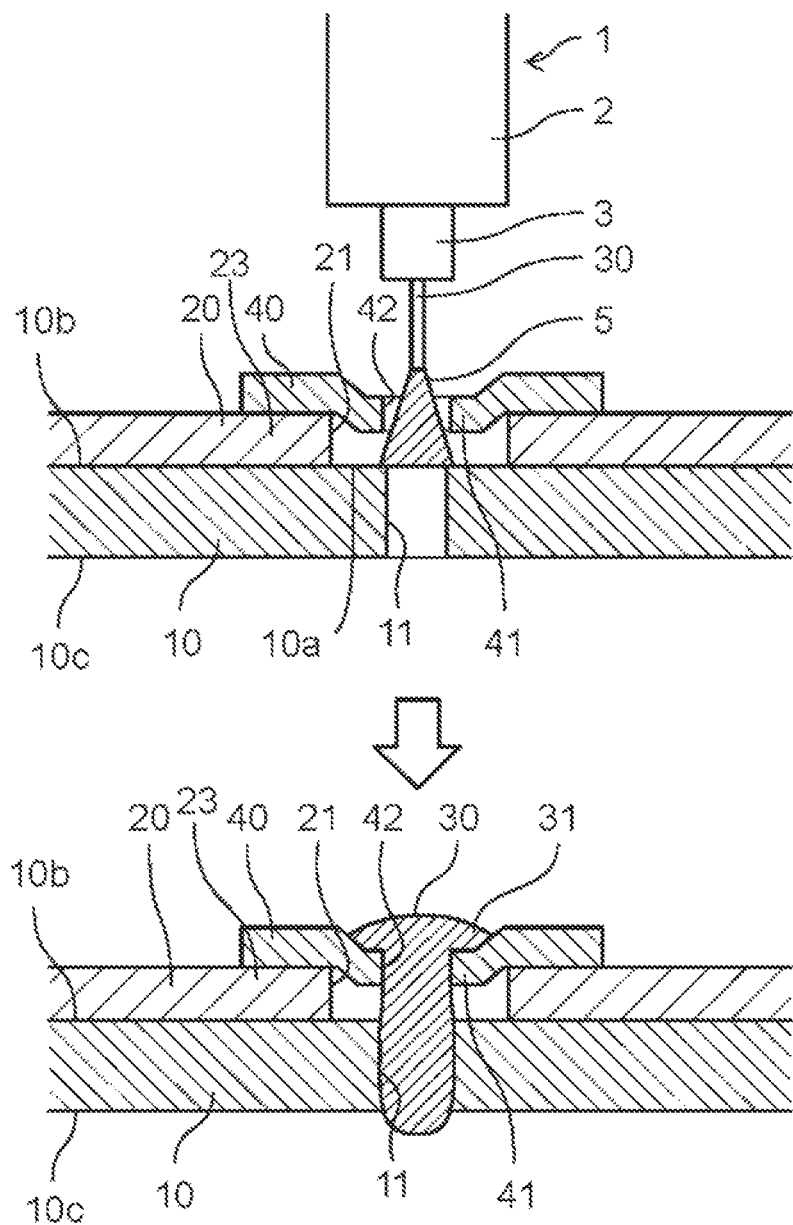
FIG. 9 is a side sectional view for describing a joining structure according to a ninth exemplary embodiment.

As illustrated in FIG. 9, first member 10 has first penetrating part 11 penetrating in the thickness direction. First penetrating part 11 is a circular through hole.

Second member 20 has second penetrating part 21 that opens at a position corresponding to first penetrating part 11 of first member 10. Fixing member 40 is overlapped with the upper surface of second member 20.

Fixing member 40 includes, for example, a rectangular or disk-shaped metal material.

An outer shape of fixing member 40 may be any shape that presses peripheral edge 23 of second member 20.

Fixing member 40 includes a metal material of a similar type that can be welded to first member 10 and third member 30. Fixing member 40 may include a material different from the materials of first member 10 and third member 30.

Fixing member 40 is provided with, in a center, embossed protrusion 41 pressed toward second member 20 in a tapered shape. Protrusion 41 is inserted into second penetrating part 21.

Fixing member 40 has fixing hole 42 that opens at a position corresponding to second penetrating part 21 and first penetrating part 11. Fixing hole 42 is formed in a bottom surface of protrusion 41.

Third member 30 is melted by arc 5. Third member 30 having been melted flows toward first penetrating part 11 through fixing hole 42 and second penetrating part 21, and is melt-bonded to the inner peripheral surface of first penetrating part 11 and opening surface 10*a* of first member 10. Third member 30 having been melted spreads in a flange shape on an upper surface of fixing member 40.

In a process in which third member 30 having been melted becomes bead, third member 30 is provided with flange 31 that presses a peripheral edge of fixing hole 42 of fixing member 40. Flange 31 indirectly presses peripheral edge 23 of second member 20 via fixing member 40.

As third member 30 solidifies and contracts, second member 20 is compressed by flange 31 and first member 10. By this compression, fixing member 40 and second member 20 are fixed between flange 31 and first member 10.

As described above, in the joining structure according to the present exemplary embodiment, when third member 30 is welded to first penetrating part 11 of first member 10, flange 31 can be formed while suppressing an amount of heat input to second member 20 by fixing member 40. Then, second member 20 as a dissimilar material can be sandwiched and fixed between first member 10 and fixing member 40.

Tenth Exemplary Embodiment

Figure 10:
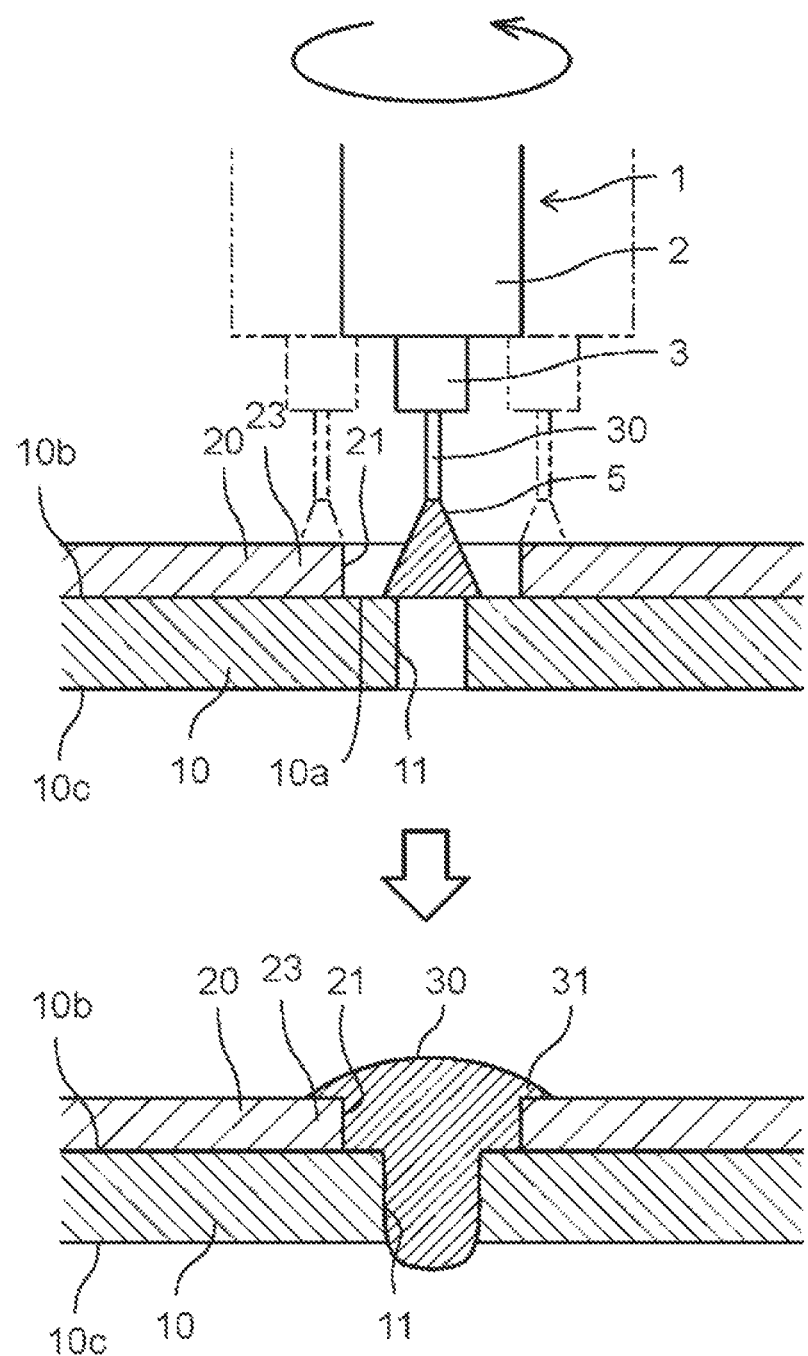
FIG. 10 is a side sectional view for describing a joining structure according to a tenth exemplary embodiment.

As illustrated in FIG. 10, first member 10 has first penetrating part 11 penetrating in the thickness direction. First penetrating part 11 is a circular through hole.

Second member 20 has second penetrating part 21 that opens at a position corresponding to first penetrating part 11 of first member 10.

Third member 30 is melted by arc 5. Third member 30 having been melted is melt-bonded to the inner peripheral surface of first penetrating part 11 and opening surface 10*a* of first member 10.

At this time, third member 30 having been melted is supplied to peripheral edge 23 by turning nozzle 2 of arc welder 1 along peripheral edge 23 of second member 20. As a result, third member 30 having been melted fills the inside of second penetrating part 21 and spreads in a flange shape on peripheral edge 23 on the upper surface of second member 20.

In a process in which third member 30 having been melted becomes bead, third member 30 is provided with flange 31 that presses peripheral edge 23.

As third member 30 solidifies and contracts, second member 20 is compressed by flange 31 and first member 10. By this compression, second member 20 as a dissimilar material is fixed between flange 31 and first member 10.

As described above, in the joining structure according to the present exemplary embodiment, nozzle 2 of arc welder 1 is turned, and peripheral edge 23 of second member 20 is arc-welded in a spiral trajectory by AC welding or short-circuit welding with low heat input, and thus flange 31 can be formed while suppressing heat input.

Eleventh Exemplary Embodiment

Figure 11:
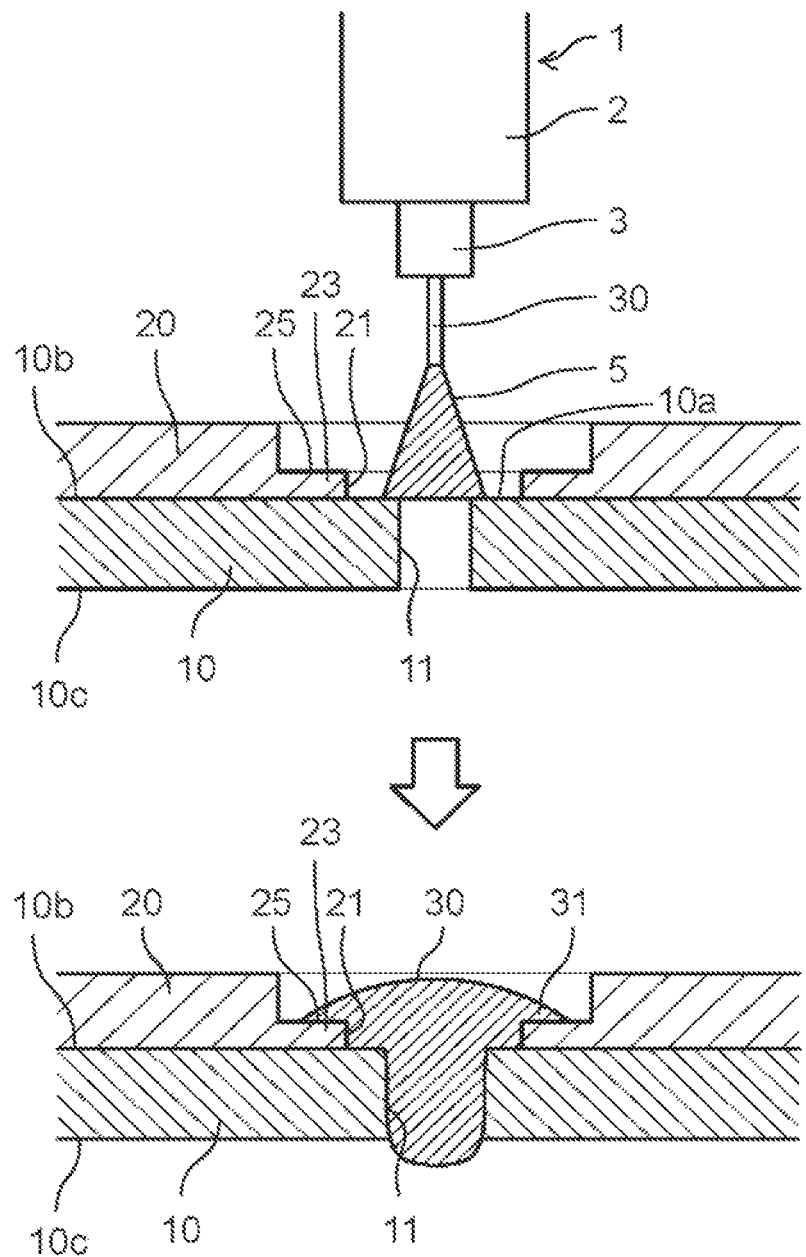
FIG. 11 is a side sectional view for describing a joining structure according to an eleventh exemplary embodiment.

As illustrated in FIG. 11, first member 10 has first penetrating part 11 penetrating in the thickness direction. First penetrating part 11 is a circular through hole.

Second member 20 includes step 25 that opens at the surface opposite to first member 10 (upper surface in FIG. 11), and second penetrating part 21 formed on the bottom surface of step 25. Second penetrating part 21 is open at a position corresponding to first penetrating part 11 of first member 10.

Third member 30 is melted by arc 5. Third member 30 having been melted is melt-bonded to the inner peripheral surface of first penetrating part 11 and opening surface 10*a* of first member 10.

Then, after filling the inside of second penetrating part 21, third member 30 having been melted flows out to peripheral edge 23 on the upper surface of second member 20, that is, the bottom surface of step 25, and spreads in a flange shape.

In a process in which third member 30 having been melted becomes bead, third member 30 is provided with flange 31 that presses peripheral edge 23.

As third member 30 solidifies and contracts, second member 20 is compressed by flange 31 and first member 10. By this compression, second member 20 as a dissimilar material is compressed and fixed between flange 31 and first member 10.

As described above, in the joining structure according to the present exemplary embodiment, flange 31 of third member 30 is disposed in step 25, and thus flange 31 can be prevented from protruding from second member 20.

Twelfth Exemplary Embodiment

Figure 12:
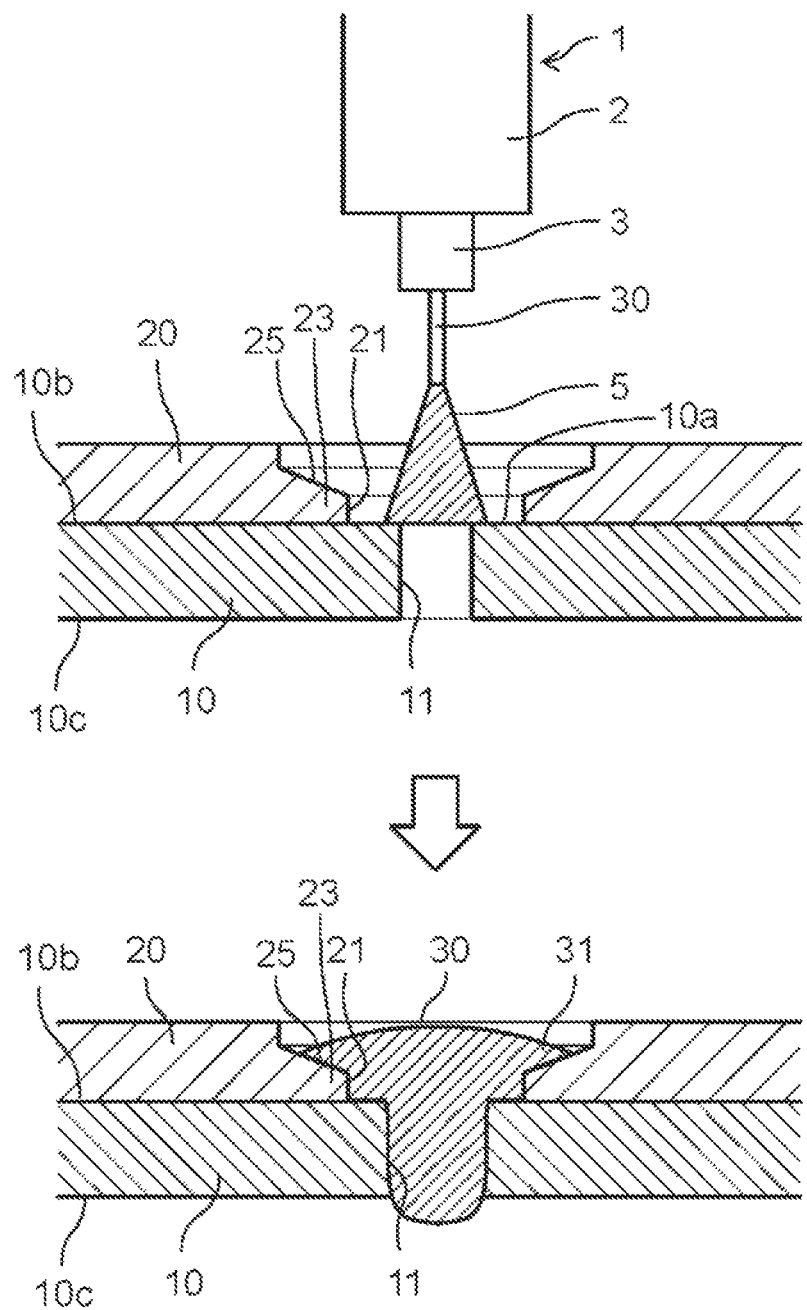
FIG. 12 is a side sectional view for describing a joining structure according to a twelfth exemplary embodiment.

As illustrated in FIG. 12, first member 10 has first penetrating part 11 penetrating in the thickness direction. First penetrating part 11 is a circular through hole.

Second member 20 includes step 25 that opens at the surface opposite to first member 10 (upper surface in FIG. 12), and second penetrating part 21 formed on the bottom surface of step 25. The bottom surface of step 25 is inclined toward second penetrating part 21. Second penetrating part 21 is open at a position corresponding to first penetrating part 11 of first member 10.

Third member 30 is melted by arc 5. Third member 30 having been melted flows toward second penetrating part 21 along an inclined surface of step 25, and then, is melt-bonded to the inner peripheral surface of first penetrating part 11 and opening surface 10a of first member 10.

Then, after filling the inside of second penetrating part 21, third member 30 having been melted flows out to peripheral edge 23 on the upper surface of second member 20, that is, the bottom surface of step 25, and spreads on the inclined surface of step 25 in a flange shape.

In a process in which third member 30 having been melted becomes bead, third member 30 is provided with flange 31 that presses the inclined surface of step 25.

As third member 30 solidifies and contracts, second member 20 is compressed by flange 31 and first member 10. By this compression, second member 20 as a dissimilar material is fixed between flange 31 and first member 10.

As described above, in the joining structure according to the present exemplary embodiment, the bottom surface of step 25 is inclined toward second penetrating part 21, and thus third member 30 having been melted easily flows toward second penetrating part 21. Further, flange 31 of third member 30 is disposed in step 25, and thus flange 31 can be prevented from protruding from second member 20.

Thirteenth Exemplary Embodiment

Figure 13:
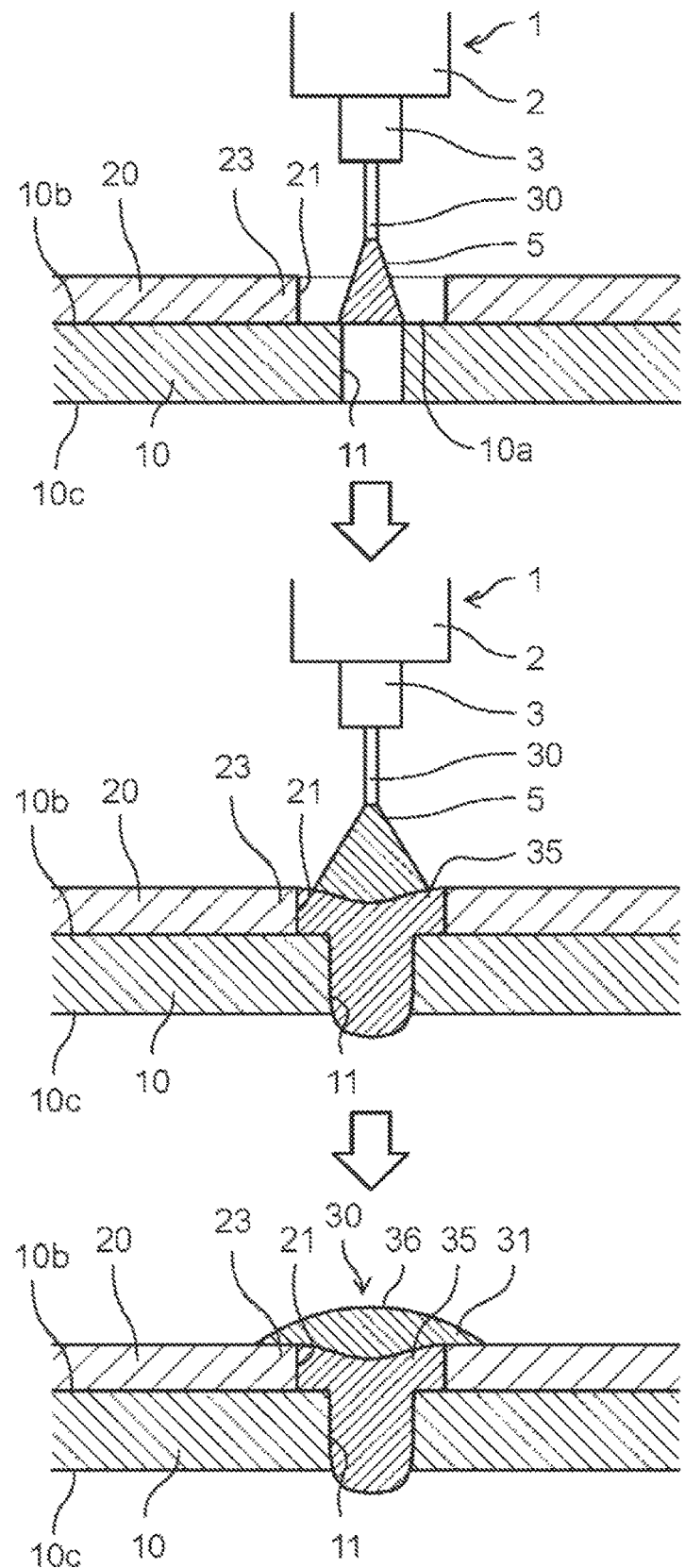
FIG. 13 is a side sectional view for describing a joining structure according to a thirteenth exemplary embodiment.

As illustrated in FIG. 13, first member 10 has first penetrating part 11 penetrating in the thickness direction. First penetrating part 11 is a circular through hole.

Second member 20 has second penetrating part 21 that opens at a position corresponding to first penetrating part 11 of first member 10.

Third member 30 is melted by arc 5. Third member 30 includes first joint 35 welded to first member 10 and second joint 36 welded to first joint 35 and constituting flange 31.

Specifically, when third member 30 having been melted is welded to first member 10 via second penetrating part 21, short-circuit welding in which spread of arc 5 is small is performed with heat input necessary for melting to form first joint 35 having a recessed upper center. Thereafter, pulse welding with positive polarity or alternating current in which arc 5 spreads largely is performed with such a low heat input not to melt second member 20, and third member 30 having been melted spreads along the recessed shape of the upper center of first joint 35 to form second joint 36. As a result, flange 31 can be formed while suppressing heat input amount to second member 20.

In a process in which third member 30 having been melted becomes bead, third member 30 is provided with first joint 35 and second joint 36. First joint 35 is melt-bonded to the inner peripheral surface of first penetrating part 11 of first member 10 and opening surface 10a of first member 10. Second joint 36 is melt-bonded to first joint 35 to constitute flange 31 pressing peripheral edge 23.

As third member 30 solidifies and contracts, second member 20 is compressed by flange 31 and first member 10. By this compression, second member 20 as a dissimilar material is fixed between flange 31 and first member 10.

As described above, in the joining structure according to the present exemplary embodiment, third member 30 is formed separately into first joint 35 and second joint 36, and it is therefore possible to selectively use a welding method or a welding condition in consideration of material characteristics of second member 20.

Other Exemplary Embodiments

The above exemplary embodiments may have the following configuration.

In the present exemplary embodiment, arc welding is performed on first penetrating part 11 of first member 10, but for example, laser filler welding may be performed.

Further, the combination of the shape of first penetrating part 11 of first member 10 and the shape of second penetrating part 21 of second member 20 described in the present exemplary embodiment is merely an example, and other combinations may be adopted.

INDUSTRIAL APPLICABILITY

As described above, the present invention is significantly useful and has high industrial applicability because it is possible to obtain a highly practical effect that the welding area of the filler material can be increased to secure the joining strength.

REFERENCE MARKS IN THE DRAWINGS 10 first member
11 first penetrating part
20 second member
21 second penetrating part
22 tapered part
13, 23 peripheral edge
25 step
30 third member
31 flange
32 lock
35 first joint
36 second joint
40 fixing member
42 fixing hole

The invention claimed is:

1. A joining structure joining, to each other, a first member including a metal material, a second member including a material that is different from the first member, and a third member including a filler material welded to the first member, wherein
   the first member has an upper surface and a lower surface opposite to the upper surface,
   the first member includes a first penetrating part penetrating in a thickness direction thereof,
   the first penetrating part extends from the upper surface to the lower surface,
   the second member includes a second penetrating part that opens at a position corresponding to the first penetrating part,
   the third member includes a flange that presses a peripheral edge of the second penetrating part, and is arc-welded, via the second penetrating part, to an inner peripheral surface of the first penetrating part of the first member and an opening surface of the first member opened by the second penetrating part of the second member, and
   the second member is compressed by the flange and the first member by solidification contraction of the third member, and thus the second member is fixed between the flange and the first member.

2. The joining structure according to claim 1, wherein the flange protrudes radially outward from the second penetrating part on a surface of the second member opposite to the first member.

3. The joining structure according to claim 1, wherein the second penetrating part is defined by the peripheral edge, the peripheral edge includes a tapered part tapered toward the first member, and the flange presses the tapered part.

4. The joining structure according to claim 1, wherein the first penetrating part has a tapered shape, the first penetrating part has a close end that is close to the second member and a far end that is far from the second member in the thickness direction, and the far end has a smaller size than the close end.

5. The joining structure according to claim 1, wherein the first penetrating part has a tapered shape, the first penetrating part has a close end that is close to the second member and a far end that is far from the second member in the thickness direction, and the far end has a larger size than the close end.

6. The joining structure according to claim 1, wherein the first penetrating part includes a plurality of first small penetrating parts smaller than the first penetrating part.

7. The joining structure according to claim 1, wherein the third member includes a lock that is locked to a peripheral edge of the first penetrating part on a surface of the first member opposite to the second member.

8. The joining structure according to claim 1, comprising a fixing member overlapped with a surface of the second member opposite to the first member, wherein the fixing member has a fixing hole that opens at a position corresponding to the second penetrating part and the first penetrating part, the third member is arc-welded, via the fixing hole and the second penetrating part, to the inner peripheral surface of the first penetrating part and the opening surface of the first member opened by the second penetrating part of the second member, the flange presses the peripheral edge of the second penetrating part via the fixing member, and the fixing member and the second member are compressed by the flange and the first member by solidification contraction of the third member, and thus the fixing member and the second member are fixed between the flange and the first member.

9. The joining structure according to claim 1, wherein the second member further includes a step that opens at a surface opposite to the first member, and the second penetrating part is disposed on a bottom surface of the step.

10. The joining structure according to claim 9, wherein the step has a bottom surface that is inclined toward the second penetrating part.

11. The joining structure according to claim 1, wherein the third member includes a first joint welded to the first member and a second joint welded to the first joint and constituting the flange.

12. The joining structure according to claim 1, wherein the first penetrating part has a smaller size than the second penetrating part, and the opening surface is a region of the upper surface of the first member within the second penetrating part.

13. The joining structure according to claim 1, wherein the material of the second member is different from the materials forming the first member and the third member.

14. The joining structure according to claim 1, wherein the material of the second member is a non-ferrous metal material or a resin material, and the material of the first and third members is an iron-based metal material.

15. A joining structure comprising:

a first member having an upper surface, a lower surface opposite to the upper surface, and a first penetrating part extending from the upper surface to the lower surface, the first member including a metal material;

a second member including a second penetrating part that opens at a position corresponding to the first penetrating part and is larger than the first penetrating part, and a peripheral edge that defines the second penetrating part, the second member including a material that is different from the metal material of the first member, and disposed on the upper surface of the first member; and a third member including a welded part arc-welded to an inner peripheral surface of the first penetrating part and a periphery of the first penetrating part on the upper surface of the first member, and a flange connected to the welded part via the second penetrating part and covering the peripheral edge, the third member including a filler material welded to the first member, wherein the second member is compressed by the flange and the first member by solidification contraction of the third member and thus fixed between the flange and the first member.

16. A joining method comprising:

preparing a first member that has an upper surface and a lower surface opposite to the upper surface, includes a first penetrating part extending from the upper surface to the lower surface, and includes a metal material;

preparing a second member that includes a second penetrating part and a peripheral edge defining the second penetrating part, and includes a material that is different from the metal material of the first member;

arranging the second member on the upper surface of the first member for the second penetrating part to be located corresponding to the first penetrating part and for an opening surface of the first member opened by the second penetrating part of the second member to be formed;

forming a third member including a filler material welded to the first member by arc-welding to an inner peripheral surface of the first penetrating part of the first member and the opening surface of the first member via the second penetrating part, the third member including a flange that presses the peripheral edge; and fixing the second member between the flange and the first member by the second member being compressed by the flange and the first member by solidification contraction of the third member.

* * * * *